United States Patent [19]

Bedford

[11] Patent Number: 4,534,619

[45] Date of Patent: Aug. 13, 1985

[54] REFLECTIVE SAFETY BELT

[76] Inventor: Richard T. Bedford, Rte. 2, Box 454J2, Tampa, Fla. 33610

[21] Appl. No.: 603,628

[22] Filed: Apr. 25, 1984

[51] Int. Cl.[3] .................................................. G02B 5/12

[52] U.S. Cl. ........................................... 350/98; 2/338

[58] Field of Search .................... 2/308, 309, 310, 326, 2/338; 224/259; 350/97, 98

[56] References Cited

U.S. PATENT DOCUMENTS

| | | | |
|---|---|---|---|
| 2,030,172 | 2/1936 | Kauffman | 350/98 |
| 2,155,342 | 4/1939 | Wolf | 350/98 |
| 2,332,948 | 10/1943 | Stubbe | 350/98 |
| 3,089,143 | 5/1963 | Jacobson | 2/338 |
| 3,901,579 | 8/1975 | Demerest | 350/98 |

*Primary Examiner*—John K. Corbin
*Assistant Examiner*—William Propp
*Attorney, Agent, or Firm*—A. W. Fisher, III

[57] ABSTRACT

A reflective safety belt configured to be worn on a person's torso comprising a pair of continuous loops intersecting each other to form an X shape on the back of the wearer and overlap each other to form an X shape on the chest of the wearer such that the pair of continuous intersecting/overlapping loops cooperatively form a pair of side openings to receive the wearer's arms and an upper opening to receive the wearer's head, the lower portion of each continuous loop forming a substantially right angle to rest on opposite hips of the wearer.

7 Claims, 4 Drawing Figures

FIG. 1
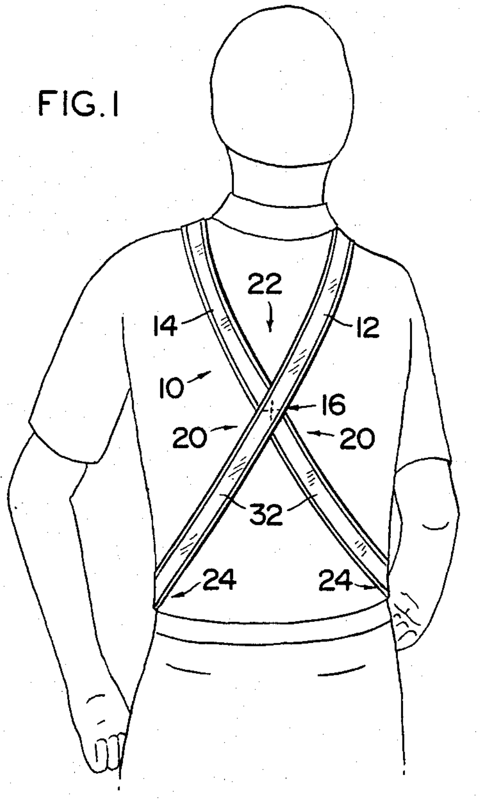
FIG. 2
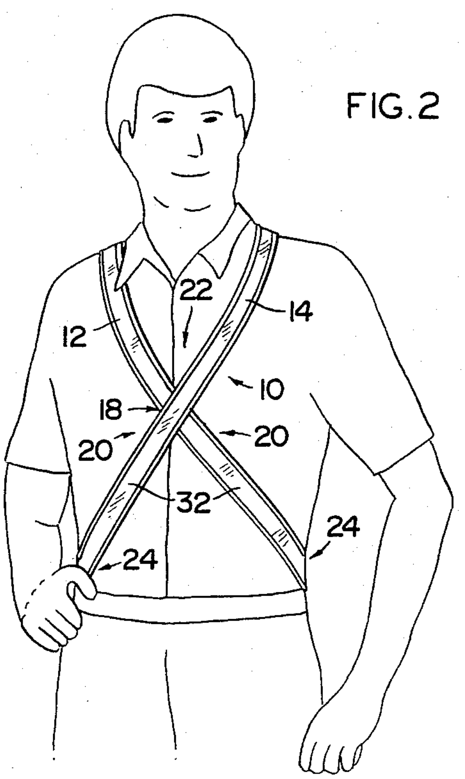
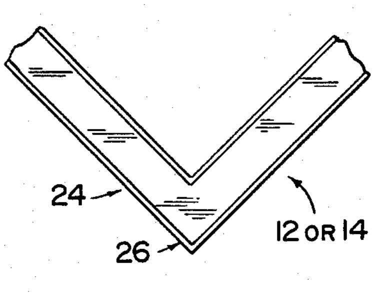
FIG. 3
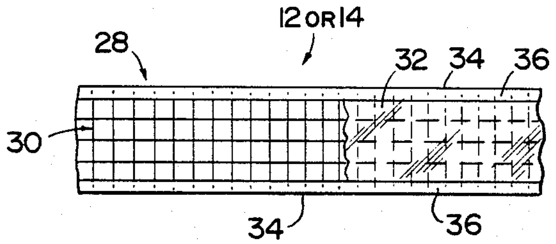
FIG. 4

REFLECTIVE SAFETY BELT

BACKGROUND OF THE INVENTION

Field of the Invention

A reflective safety belt configured to be worn on a person's torso comprising a pair of continuous loops intersecting each other to form an X shape on the back of the wearer and then overlap each other to form an X shape on the chest of the wearer.

SUMMARY OF THE INVENTION

The present invention relates to a reflective safety belt configured to be worn on a person's torso comprising a pair of continuous loops. The pair of continuous loops intersect each other to form an X shape on the back of the wearer and overlap each other to form an X shape on the wearer to cooperatively form a pair of side openings to receive the wearer's arms and an upper opening to receive the wearer's head.

Each continuous loop comprises a backing having a predetermined pattern of intersecting lines to form a visual matrix and a moisture resistant transparent reflective covering overlaying the backing.

In use, the wearer slips or places his/her arms through the side openings and head through the upper opening to place the reflective safety belt on the wearer's torso. As previously set forth, the intersection of the continuous loops are secured together to form the X shape on the back of the wearer and overlap to form a loose fitting X shape on the wearer's chest.

Once in place, the wearer is free to move about with the reflective safety belt providing a clear visual cue to oncoming traffic.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller indication of the nature and objects of the invention, reference should be had to the following detailed description taken in connection with the accompanying drawings in which:

FIG. 1 is a back view of the reflective safety belt.

FIG. 2 is a front view of the reflective safety belt.

FIG. 3 is a detailed view of the lower portion of a continuous loop.

FIG. 4 is a detailed partial cross-sectional view of a continuous loop.

Similar reference characters refer to similar parts throughout the several views of the drawings.

DETAILED DESCRIPTION OF THE PREFERRED EMBODIMENT

As shown in FIGS. 1 and 2, the present invention relates to a reflective safety belt generally indicated as 10 configured to be worn on a person's torso comprising a pair of continuous loops indicated as 12 and 14.

The pair of continuous loops 12 and 14 intersect each other to form an X shape 16 on the back of the wearer and overlap each other to form an X shape 18 on the chest of the wearer. Thus the pair of continuous intersecting/overlapping loops 12 and 14 cooperatively form a pair of side openings each indicated as 20 to receive the wearer's arms and an upper opening 22 to receive the wearer's head.

The lower portion 24 of each continuous loop 12 and 14 forms a substantially right angle 26 as best shown in FIG. 3 to rest on opposite hips of the wearer.

As best shown in FIG. 4, each continuous loop comprises a backing generally indicated as 28 having a predetermined pattern of intersecting lines generally indicated as 30 to form a visual matrix and a moisture resistant transparent colored reflective covering 32 overlaying the backing 28. The peripheral edges 34 on opposite sides of the backing and moisture resistant transparent colored reflective covering are secured together by a fastening border 36.

In use, the wearer slips or places his/her arms through the side openings 20 and head through the upper opening 22 to place the reflective safety belt 10 on the wearer's torso. The intersection of the continuous loops 12 and 14 are secured together to form the X shape 16 as previously described on the back of the wearer and overlap to form a loose fitting X shape 18 on the wearer's chest.

Once in place, the wearer is free to move about with the reflective safety belt 10 providing a clear visual cue to oncoming traffic.

It will thus be seen that the objects set forth above and those made apparent from the preceeding description are efficiently attained and since certain changes may be made in the above construction without departing from the scope of the invention, it is intended that all matter contained in the above description and shown in the accompanying drawings shall be interpreted as illustrative and not in a limited sense.

It is also to be understood that the following claims are intended to cover all of the generic and specific features of the invention herein described, and all statements of the scope of the invention which as a matter of language might be said to fall therebetween.

Now that the invention has been described, what is claimed is:

1. A reflective safety belt configured to be worn on a person/user consisting of a pair of continuous loops intersecting each other on the back of the wearer and overlapping each other on the chest of the wearer such that the continuous intersecting/overlapping loops cooperatively form a pair of side openings to receive the wearer's arms and an upper opening to receive the wearer's head.

2. The reflective safety belt of claim 1 wherein said intersection on the back of the wearer forms a substantially X shape and the overlapping of said continuous loops on the chest of the wearer forms a substantially X shape.

3. The reflective safety belt of claim 2 wherein the lower portion of each said continuous loop forms a substantially right angle to rest on opposite hips of the wearer.

4. The reflective safety belt of claim 1 wherein each said continuous loop comprises a backing having a predetermined pattern of intersecting lines to form a reflective matrix thereon.

5. The reflective safety belt of claim 4 wherein each said continuous loop comprises a moisture resistant colored reflective covering overlapping said reflective backing.

6. The reflective safety belt of claim 5 wherein the peripheral edges of said reflective backing and said moisture resistant covering are secured together by a fastening border extending along opposite peripheral edges thereof.

7. The reflective safety belt of claim 4 wherein each said continuous loop further includes a moisture resistant covering overlaying said backing.

* * * * *